US009889418B2

(12) United States Patent
Pretz et al.

(10) Patent No.: US 9,889,418 B2
(45) Date of Patent: Feb. 13, 2018

(54) FLUIDIZED FUEL GAS COMBUSTOR SYSTEM FOR A CATALYTIC DEHYDROGENATION PROCESS

(71) Applicant: Dow Global Technologies LLC, Midland, MI (US)

(72) Inventors: Matthew T. Pretz, Freeport, TX (US); Richard E. Walter, Long Valley, NJ (US); Don F. Shaw, Denville, NJ (US); Fermin A. Sandoval, Houston, TX (US); Liwei Li, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/868,507

(22) Filed: Sep. 29, 2015

(65) Prior Publication Data

US 2017/0087528 A1    Mar. 30, 2017

(51) Int. Cl.
| | | |
|---|---|---|
| *B01J 7/00* | (2006.01) | |
| *B01J 8/00* | (2006.01) | |
| *B01J 19/00* | (2006.01) | |
| *B01J 19/24* | (2006.01) | |
| *B01J 35/00* | (2006.01) | |
| *B01J 35/02* | (2006.01) | |

(Continued)

(52) U.S. Cl.
CPC ............... *B01J 7/00* (2013.01); *B01J 8/1818* (2013.01); *B01J 8/1827* (2013.01); *B01J 8/34* (2013.01); *B01J 8/44* (2013.01); *B01J 38/02* (2013.01); *F23C 10/12* (2013.01); *F23C 10/20* (2013.01); *F23C 10/22* (2013.01); *B01J 2208/00504* (2013.01)

(58) Field of Classification Search
CPC ......... B01J 7/00; B01J 8/00; B01J 8/18; B01J 19/00; B01J 19/24; B01J 35/00; B01J 35/02; B01J 38/00; B01J 38/02
See application file for complete search history.

(56) References Cited

U.S. PATENT DOCUMENTS 2,472,502 A    6/1949   Tyson
2,481,439 A    9/1949   Ogorzaly
(Continued)

FOREIGN PATENT DOCUMENTS

WO      WO 01/44146 A1 *   6/2001
WO      WO2007/094771        8/2007

OTHER PUBLICATIONS

International Search Report and Written Opinion pertaining to PCT/US2016/054081 dated Dec. 16, 2016.

*Primary Examiner* — Natasha Young
(74) *Attorney, Agent, or Firm* — Dinsmore & Shohl LLP (57) ABSTRACT

A fluidized fuel gas combustor system for a catalytic dehydrogenation process comprising a vessel having a lower portion and an upper portion; a plurality of air injection diffusers located in the lower portion of the vessel; a plurality of fuel gas injection diffusers located on fuel gas distributors disposed in the vessel and spaced apart from and above a plurality of air injection diffusers, wherein the fuel gas diffusers are placed in a manner to maximize even mass distribution of a fuel gas injected through the fuel gas diffusers in the vessel, wherein each fuel distributor comprises a tube having a plurality of fuel gas injection diffusers; and one or more grid assemblies disposed in the vessel spaced above the fuel gas distributors is provided.

17 Claims, 6 Drawing Sheets

(51) Int. Cl.
  *B01J 38/00* (2006.01)
  *B01J 38/02* (2006.01)
  *B01J 8/18* (2006.01)
  *B01J 8/34* (2006.01)
  *B01J 8/44* (2006.01)
  *F23C 10/12* (2006.01)
  *F23C 10/20* (2006.01)
  *F23C 10/22* (2006.01)

(56) References Cited

U.S. PATENT DOCUMENTS

| | | |
|---|---|---|
| 2,545,165 A | 3/1951 | Ogorzaly |
| 4,198,210 A | 4/1980 | Worley et al. |
| 4,443,551 A * | 4/1984 | Lionetti .............. C10G 11/182 208/163 |
| 4,615,992 A | 10/1986 | Murphy |
| 4,646,637 A | 3/1987 | Cloots |
| 5,377,627 A | 1/1995 | Andersson |
| 5,411,710 A | 5/1995 | Iwasyk |
| 5,910,240 A | 6/1999 | Senior et al. |
| 6,525,232 B1 * | 2/2003 | Bierl .................. B01J 8/0453 585/440 |
| 6,680,030 B2 | 1/2004 | Koebel et al. |
| 7,022,221 B1 | 4/2006 | Hedrick |
| 7,077,997 B1 | 7/2006 | Sandacz |
| 7,842,846 B2 * | 11/2010 | Hechler .................. C07C 5/48 422/240 |
| 8,092,755 B2 | 1/2012 | Castagnos, Jr. et al. |
| 8,480,965 B2 | 7/2013 | Castagnos, Jr. et al. |
| 8,669,406 B2 | 3/2014 | Pretz et al. |
| 2012/0234727 A1 | 9/2012 | Fusco et al. |
| 2013/0161563 A1 | 6/2013 | Jiang et al. |
| 2013/0252799 A1 | 9/2013 | Johnson, II et al. |
| 2014/0010716 A1 | 1/2014 | Castagnos, Jr. et al. |
| 2014/0294685 A1 | 10/2014 | Johnson, II et al. |
| 2014/0296603 A1 | 10/2014 | Johnson, II et al. |

* cited by examiner

FLUIDIZED FUEL GAS COMBUSTOR SYSTEM FOR A CATALYTIC DEHYDROGENATION PROCESS

FIELD OF INVENTION

The instant invention relates to a fluidized fuel gas combustor system for a catalytic dehydrogenation process.

BACKGROUND OF THE INVENTION

Conventional catalyst reactivation or regeneration processes that treat catalysts with a reduced catalytic activity due, at least in part, to deposition of coke on catalyst surfaces involve removal of that coke, generally by contacting such catalysts at high temperature (e.g. at least 450 degrees Celsius (° C.) for an ethanol dehydration catalyst and at least 650° C. for a fluid catalyst cracking (FCC) catalyst) with air or another oxygen-containing gas The conventional catalyst reactivation processes do not provide enough heat to drive the endothermic dehydrogenation reaction. Therefore, supplemental fuel must be added to some processes. The supplemental fuel further deactivates the catalyst in a catalytic dehydrogenation process using a gallium-platinum catalyst on alumina or alumina silica support, i.e., catalysts used in catalytic dehydrogenation of ethane, propane, butane, isobutane, butene, and ethylbenzene. Those who practice alkane dehydrogenation, especially propane dehydrogenation (PDH) understand that if enough heat is not provided to drive the endothermic reaction, alkene production decreases to a point where process economics dictate additional heat sources be added to drive the reaction.

During the regeneration process, the dehydrogenation activity is damaged due to the combustion of an external fuel source. The distribution of the fuel source is critical to achieve maximum combustion of the external fuel source on the catalyst as well as minimize any potential deactivation of the catalyst due to uneven distribution of fuel.

One constraint is that the distributor pipes themselves cannot block a high percentage of the combustor open area or the combustor will flood at this level or the catalyst will not be able to backmix and form a dense bed. For example, in one currently available design the distributor pipes block ~26% of the open area. The base superficial velocity is 3.5-4 ft/s at this level in the combustor. With the blockage, the actual velocity will be 4.7-5.4 ft/s which are below the maximum of 8.0 ft/s where the catalyst will not be able to flow downward.

The fuel is often injected at ambient temperature which causes it to heat up as it transverses the distributor pipe within the bed which is operated at 680-800° C. and preferably from 700-770° C. As the fuel heats up, as it traverses a given pipe distributor, the gas density decreases which leads to maldistribution. The first part of the pipe will release more mass of fuel than the portion of the pipe that allows the gas to be in the vessel the longest. Therefore, maldistribution occurs. The maldistribution may cause portions of the combustor to have more stoichiometric fuel than air locally which means the fuel will have to mix with additional air and/or catalyst prior to combusting. This fuel contacting of the catalyst at high temperature results in catalyst deactivation that is not desirable.

SUMMARY OF THE INVENTION

In one embodiment, the instant invention provides a fluidized fuel gas combustor system for a catalytic dehydrogenation process comprising a vessel having a lower portion and an upper portion; a plurality of air injection diffusers located in the lower portion of the vessel; optional fuel oil distributors for startup; a plurality of fuel gas injection diffusers located on fuel gas distributors disposed in the vessel and spaced apart from and above a plurality of air injection diffusers, wherein the fuel gas diffusers are placed in a manner to maximize even mass distribution of a fuel gas injected through the fuel gas diffusers in the vessel; one or more optional grid assemblies disposed in the vessel spaced apart from and above the plurality of air injection diffusers and spaced apart from and below the fuel gas distributors to maximize even air mass distribution; and one or more grid assemblies disposed in the vessel spaced above the fuel gas distributors.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
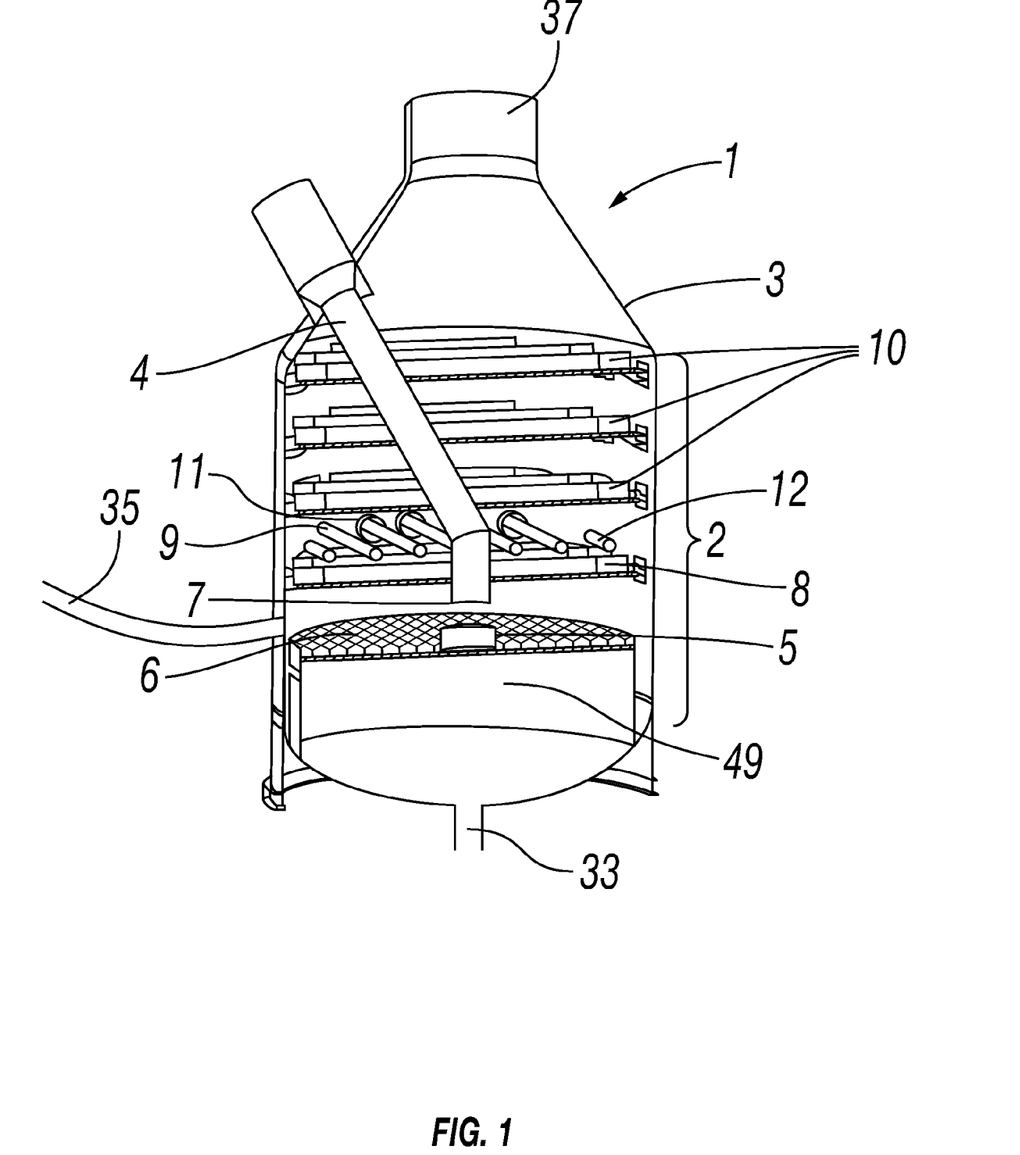
FIG. 1 is a cutaway elevational view of a vessel used in a catalyst reactivation according to the present disclosure.

Referring to FIG. 1, a cutaway elevational view of an embodiment of a vessel 1 used as a fluidized fuel gas combustor system for a catalytic dehydrogenation process is shown. Vessel 1 includes a lower portion 2 generally in the shape of a cylinder and an upper frustrum section 3. The angle between the frustum 3 and an internal horizontal imaginary line drawn at the intersection of the frustrum 3 and the lower portion 2 may range from 10 to 80 degrees. All individual values and subranges from 10 to 80 degrees are included and disclosed herein; for example the angle between the tubular and frustum components can range from a lower limit of 10, 40 or 60 degrees to an upper limit of 30, 50, 70 or 80 degrees. For example, the angle can be from 10 to 80 degrees, or in the alternative, from 30 to 60 degrees, or in the alternative, from 10 to 50 degrees, or in the alternative, from 40 to 80 degrees. Furthermore, in alternative embodiments, the angle can change along the height of the frustum, either continuously or discontinuously. In some embodiments, the vessel 1 may be, or may not be, lined with a refractory material.

Spent or partially deactivated catalyst enters the vessel 1 through downcomer 4. In alternative configurations, the spent or partially deactivated catalyst may enter vessel 1 from a side inlet or from a bottom feed, passing upward through the air distributor. The used catalyst impinges upon and is distributed by splash guard 5. The vessel 1 further includes air distributors 6 which are located at or slightly below the height of the splash guard 5. Above the air distributors 6 and the outlet 7 of downcomer 4 is a grid 8. Above the grid 8 are a plurality of fuel gas distributors 9. One or more additional grids 10 may be positioned within the vessel above the fuel gas distributors 9.

Figure 2:
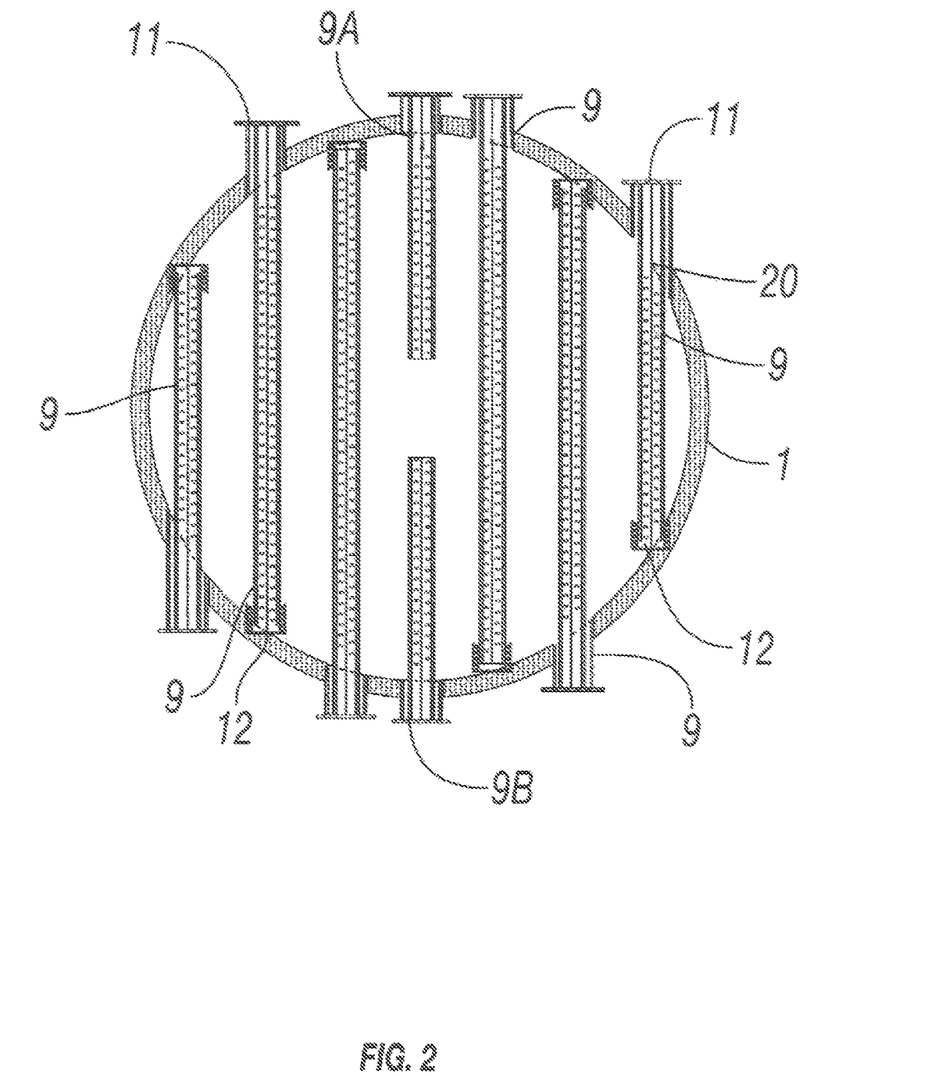
FIG. 2 is a top view of top view of a first embodiment of fuel gas distributors.
Figure 3:
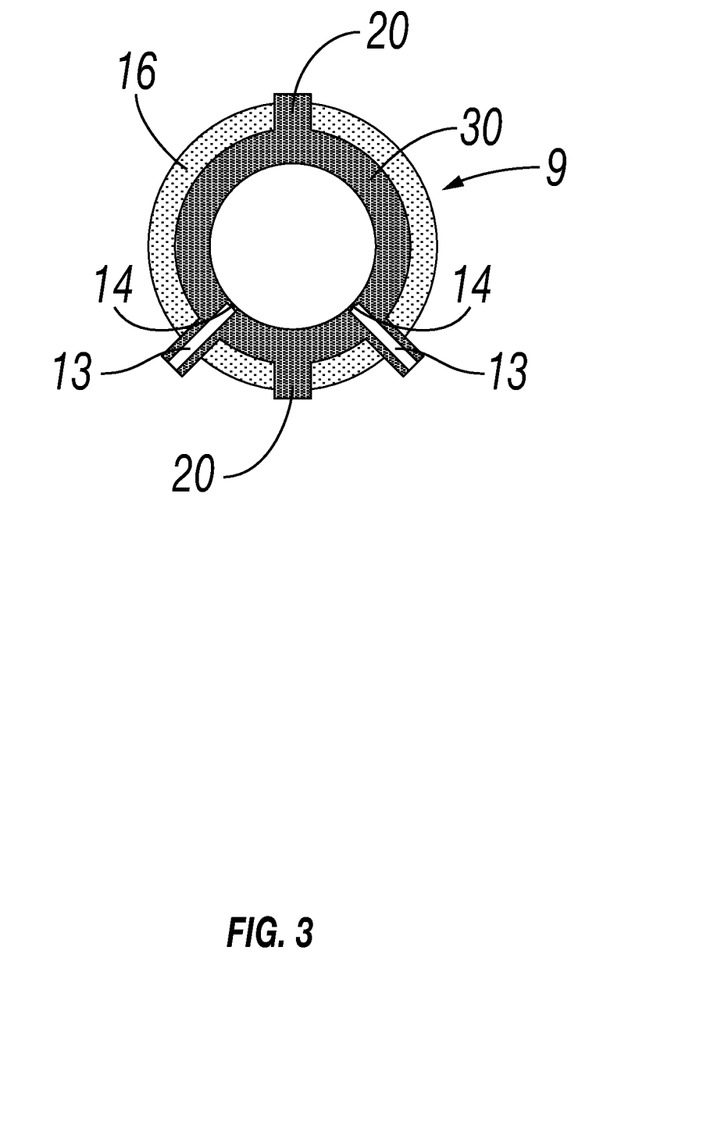
FIG. 3 is an cross sectional view of a first embodiment of a reinforced tube.
Figure 4:
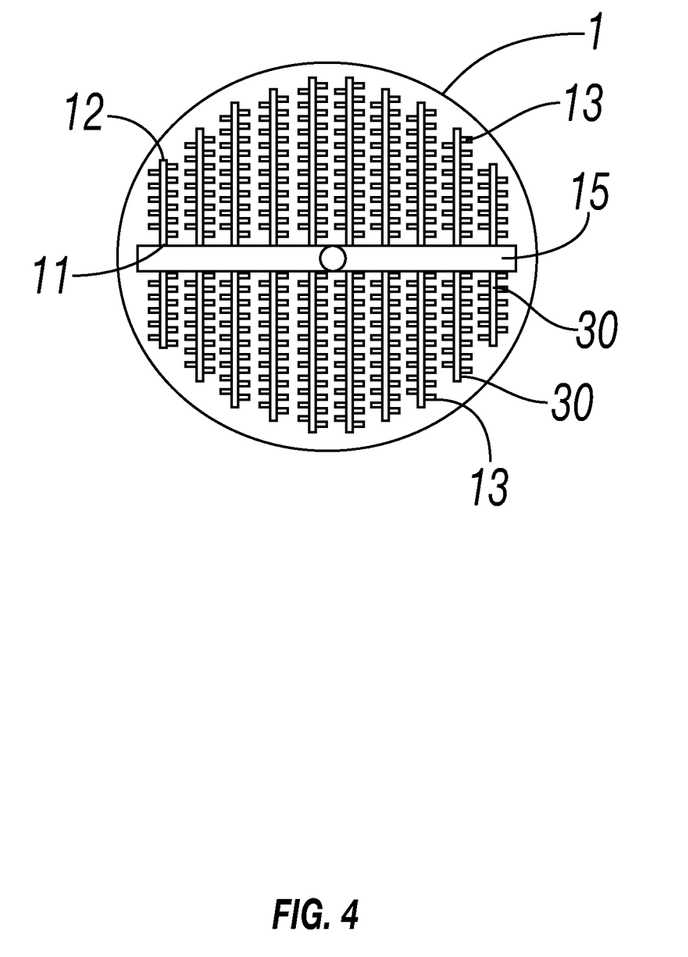
FIG. 4 is a top view of a second embodiment of fuel gas distributors.

In a first embodiment, the fuel gas distributors 9 enter the vessel 1 and traverse substantially a chord of the vessel 1. As seen in FIGS. 2 and 3, each fuel gas distributor 9 comprises a tube 30 with a fuel inlet end 11 and a terminal end 12. Referring now to FIG. 3, it is seen that each tube 30 may further include at least one reinforcing element 20 running along at least part of the length of the tube 30. The reinforcing element(s) 20 may be of any shape or material which adds strength to tube 30, including for example, square bars (as shown in FIG. 3) and round bars. Each fuel gas distributor 9 further comprises a plurality of fuel gas injection diffusers 13. The fuel gas injection diffusers 13 permit the fuel gas to exit the tube 30 at an acceptable velocity, generally 50-300 feet per second and enter the interior space of vessel 1. A small orifice 14 at the start of each fuel gas injection diffusers 13 creates pressure drop and ensures more even distribution of the fuel gas into the bed. As shown in FIG. 2, the fuel inlet ends 11 of adjacent fuel gas distributors 9 are on opposite sides of the vessel 1. Such alternating fuel inlet ends 11 provide one manner to maximize even mass distribution of a fuel gas injected through the fuel gas diffusers 9 in the vessel 1 due to the heat up phenomenon. Alternatively, the maximization of even fuel mass distribution may be achieved by using sets of two tubes which span only a portion of a chord entering from opposing sides of the vessel, as is shown in FIG. 2 by the fuel gas distributors marked as 9a and 9b. Yet another method of maximizing even mass distribution of the fuel is the use of a gradient distribution of fuel gas injection diffusers 13 with a greater number of fuel gas injection diffusers 13 toward the terminal end 12 of each tube 30. Yet another method is to increase the size of the fuel gas injection diffusers 13 and the small orifices 14 toward the terminal end 12 of each tube 30. Other types of fuel gas injection configurations can be used such as pipe distributors that are fed from one or more headers 15 that allow a main fuel gas stream to enter either from the side, top or bottom of vessel 1 and be fed to multiple tubes 30, each tube 30 having a plurality of fuel gas injection diffusers 13, as is shown in FIG. 4. The inlet ends 11 of tubes 10 in FIG. 4 join to the header 15 and the terminal ends 12 are located proximate to the vessel wall. The fuel gas may be fed at different elevations within the vessel 1 although the preferred embodiment is to feed the fuel gas in a single level.

Figure 6:
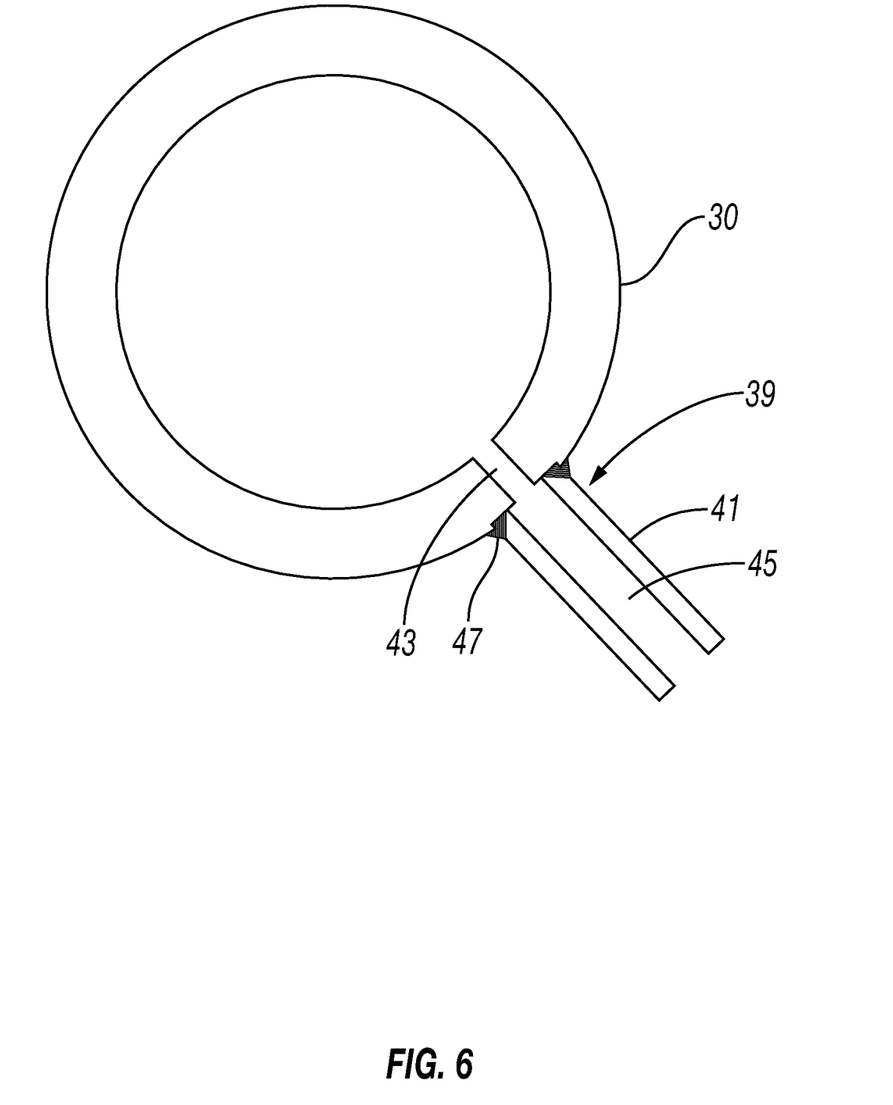
FIG. 6 is a cross sectional schematic of a second embodiment of a tube and fuel gas injection distributor.

Hydrocarbon feeds such as methane may begin to coke in these cracks and force the diffuser away from the pipe. The diffusers can be welded to the outside of the pipe with the orifice drilled through the pipe or in any manner that avoids the interior crack into which the hydrocarbon could enter. FIG. 6 illustrates another embodiment of the tube and fuel gas injection diffusers. As seen in FIG. 6, tube 30 and a single fuel gas injection diffuser 39, both in cross section. As shown in FIG. 6, no reinforcing element or refractory is present. Fuel gas injection diffuser 39 comprises a shroud 41 which is attached onto tube 30 and a bore 43 passing through the outer wall of tube 30 and communicating with an internal passage 45 of shroud 41. Shroud 41 is attached to tube 30 so as to not allow an exposed crack between the inside of the tube 30 and the fuel gas injection diffuser 39. As shown in FIG. 6, such attachment is made by a weld 47 which extends around the outer surface of shroud 41 at its juncture with an outer surface of tube 30.

Alternative methods of maximizing even mass distribution of a fuel gas may be accomplished using alternative configurations, such as that of the feed distributor of FIG. 2 of U.S. Pat. No. 8,894,940, the disclosure of which is incorporated herein by reference.

The fuel gas can be methane, natural gas, ethane, propane, hydrogen or any gas that comprises energy value upon combustion.

Vessel 1 may further include one or more components selected from the group consisting of oxygen containing gas inlet 33 which communicates with space 49, supplemental fuel inlet, spent catalyst inlet 35, regenerator recycle catalyst inlet, and vessel outlet 37.

The disclosure further provides the system for fuel injection according to any embodiment disclosed herein except that one or more of the reinforced tubes are at least partially covered with a refractory material to minimize heat transfer from the bed to the gaseous fuel. Referring to the embodiment shown in FIG. 3, the tube 30 has two reinforcing elements 11. Between each reinforcing elements 11, the tube 30 is coated in an optional refractory material 16. Likewise, the refractory material 16 may be located between the fuel gas injection diffusers 13 and the reinforcing elements 11. Any appropriate refractory material and anchoring may be used, including for example, RESCOCAST AA22S, RESCOCAST 7, 8, and 9 and R-MAX MP (all of which are commercially available from Resco Products, Inc. (Pittsburgh, Pa., USA), ACTCHEM 85 (commercially available from ARTech Inc.). Generally, for high temperature applications a thin layer of lining ½ to 1" of refractory in a specialized anchor system such as hex mesh or a pipe tab, as are known in the art, may be used.

Below the fuel gas distributors 9 is grid assembly 8. Grid assembly 8 assists in maximizing even air mass distribution. The grid assemblies 8 and 10 may have in certain embodiments, the forms disclosed in U.S. patent application Ser. No. 14/755,008, filed Jun. 30, 2015 and U.S. patent application Ser. No. 14/751,424, filed Jun. 26, 2015, the disclosures of which are incorporated herein by reference.

The outlet 7 of downcomer 4 is located below the fuel gas distributors 9 and the grid assembly 8 and empties into a space between the grid assembly 8 and air distributor 6.

Air distributor 6 comprises a plurality of air injection diffusers 16. Between the air injection diffusers 16, an optional refractory material may be used. In a particular embodiment, three to seven inches of a refractory material, such as RESCOCAST 8, may be used to minimize the temperature of the air injection diffusers 16. For example, the air entering the air injection diffusers may be at about 635° C., with the temperature of the grid 8 being at about 750° C. In such instance, the air injection diffusers would be at about 640° C.

The air injection diffusers 16 can be located on a flat grid plate and skirt, on a dished grid plate and skirt or on a pipe grid distributor. The air distributor 6 may, in certain embodiments, have a thinner metal edging at a bottom portion of the distributor.

Figure 5:
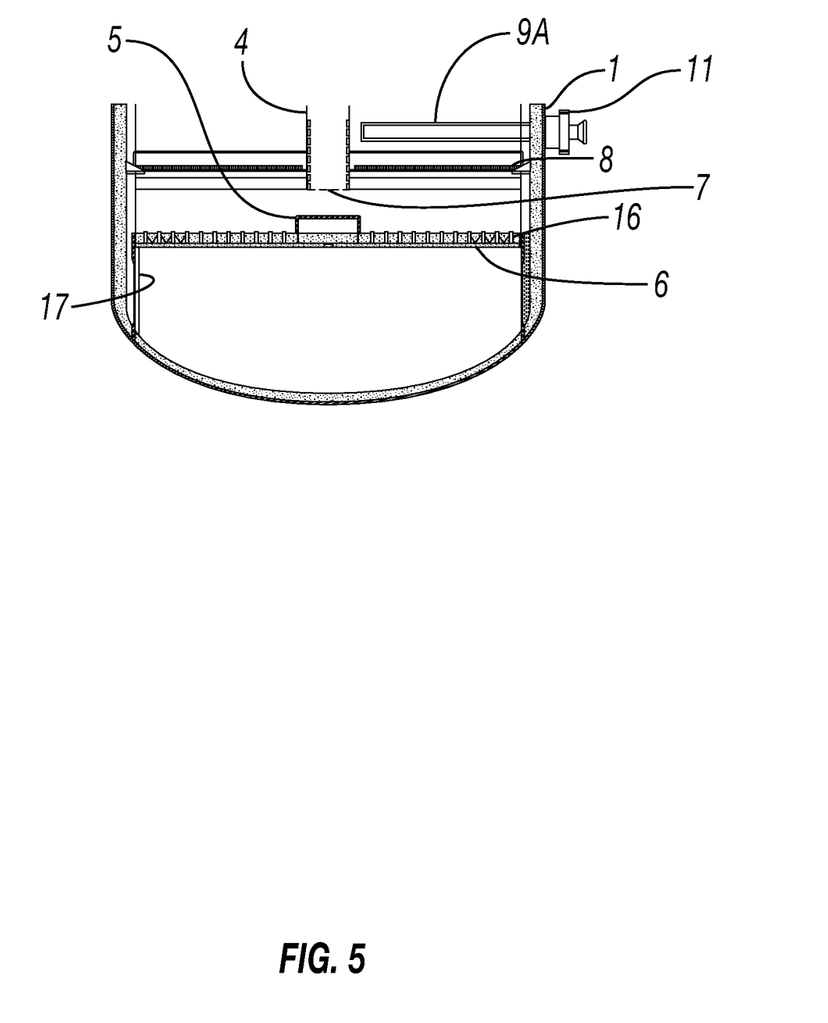
FIG. 5 is a cross sectional elevational schematic of a bottom portion of the vessel illustrating the fuel gas distributors and air gas distributors.

FIG. 5 shows the grid plate and skirt option for supporting the air injection diffusers 16. As seen in FIG. 5, a skirt 17 extends downward from the air distributor 6. In a particular embodiment, the length of the skirt 17 extending downward from the air distributor 6 may range from 3 to 7 feet. In a specific embodiment, the skirt 17 may have a thickness of from 0.75 to 3 inches over its length extending from the air distributor 6 to a length of 6 to 18 inches with a narrowing of the skirt thickness (not shown) to a 0.25 to 0.625 inch further down the length of the skirt. Such a taper in the skirt thickness provides greater skirt strength proximate to the air distributor 6 for resistance to thermal and pressure stresses and for greater skirt flexibility at the lower portion of the skirt.

In alternative embodiments, the air distributor 6 may have the configurations discussed above in connection with the fuel gas distributor. That is, the air distributor may comprise a plurality of tubes entering the side of vessel 1 or may be fed through a header.

Used catalyst exiting the outlet 7 of downcomer 4 impinges upon and is distributed by splash plate 5. In some embodiments, splash plate 5 may be at least partially covered in a refractory material, for example, by 0.5 to 1 inch thick hex mesh refractory.

The disclosure further provides the fluidized fuel gas combustor system for a catalytic dehydrogenation process according to any embodiment disclosed herein except that each reinforced tube comprises two rows of fuel gas diffusers at a density of from 5 to 100 diffusers per square meter of the cross sectional area of the combustor wherein the rows are spaced apart and angled downward at 45 degrees at approximately 90 degrees from each other. All individual values and subranges from 5 to 100 diffusers per square meter are included and disclosed herein; for examples the density of fuel gas diffusers may range from a lower limit of 5, 10 or 15 to an upper limit of 100, 90 or 80 diffusers per square meter. For example, the density of fuel gas diffusers may range from 5 to 100 diffusers per square meter, or in the alternative, from 10 to 80 diffusers per square meter, or in the alternative, from 15 to 70 diffusers per square meter.

The disclosure further provides the fluidized fuel gas combustor system for a catalytic dehydrogenation process according to any embodiment disclosed herein except that the air distributor is a pipe distributor, dished plate or flat plate grid distributor with an air diffuser density of from 5 to 100 air diffuser per square meter. All individual values and subranges from 5 to 100 air diffusers per square meter are included and disclosed herein; for example, the density of air diffusers may range from a lower limit of 5, 10 or 15 diffusers per square meter to an upper limit of 100, 90 or 80 air diffusers per square meter. For example, the air diffuser density may range from 5 to 100 air diffusers per square meter, or in the alternative, from 10 to 90 diffusers per square meter, or in the alternative, from 20 to 80 diffusers per square meter.

The disclosure further provides the fluidized fuel gas combustor system for a catalytic dehydrogenation process according to any embodiment disclosed herein except that the air distributor supplies sufficient air to provide greater than 110% of the stoichiometric required amount oxygen for fuel gas combustion. All individual values and sub-ranges greater than 110% are included and disclosed herein. For example, the air distributor may supply sufficient air to provide greater than 125% of the stoichiometric required amount oxygen for fuel gas combustion, or in the alternative, greater than 135%, or in the alternative, greater than 150%, or in the alternative, greater than 165%.

The disclosure further provides the fluidized fuel gas combustor system for a catalytic dehydrogenation process according to any embodiment disclosed herein except that the air distributor supplies sufficient air to provide greater than 105% of the stoichiometric required amount oxygen for fuel gas and coke combustion. All individual values and sub-ranges greater than 105% are included and disclosed herein. For example, the air distributor may supply sufficient air to provide greater than 125% of the stoichiometric required amount oxygen for fuel gas and coke combustion, or in the alternative, greater than 135%, or in the alternative, greater than 150%, or in the alternative, greater than 165%.

The disclosure further provides the fluidized fuel gas combustor system for a catalytic dehydrogenation process according to any embodiment disclosed herein except that the grid assembly sections comprise means for blocking open area that have an open area of from 30% to 98% with gas velocities through the openings less than 8 feet per second. All individual values and subranges from 30 to 98% are included and disclosed herein; for example, the open area may range from a lower limit of 30, 40, 50, 60, 70 or 80% to an upper limit of 50, 60, 70, 80, 90 or 98%. For example, the open area may range from 30 to 98%, or in the alternative, from 30 to 75%, or in the alternative, from 75 to 98%, or in the alternative, from 65 to 95%. Such means include, for example, packing, chevrons and subway grating as well as any means disclosed in U.S. patent application Ser. No. 14/755,008, filed Jun. 30, 2015 and U.S. patent application Ser. No. 14/751,424, filed Jun. 26, 2015, the disclosures of which are incorporated herein by reference.

In the fluidized fuel gas combustor system in a dehydrogenation process, the partially deactivated, or used, catalyst is heated to a temperature of at least 660° C. but no greater than 850° C., preferably from 700° C. to 770° C., and more preferably from 720° C. to 750° C. Again, as for the dehydrogenation reactor, it is preferred that the combustor, which serves as a part of the regeneration area and wherein the supplemental fuel and coke will be combusted (i.e., oxidized with an oxygen containing gas) to form $H_2O$ and $CO_2$, comprise a lower section operating as a fast fluidized, turbulent, or bubbling bed and an upper section operating as a riser. This enables the combustor to operate with an average catalyst and gas flow moving concurrently upward. In this configuration the internals are critical to break up the bubbles and promote fuel, air and catalyst mixing. Another possible configuration, designed instead to enable an average catalyst flow downward and an average gas flow upward, comprises a fast fluidized, turbulent, or bubbling bed. Regardless of configuration, heat for the regenerator's combustion comes from a combination of combustion of the deposited coke, i.e., the coke itself supplies heat as a result of the oxidation reaction, and combustion of a supplemental fuel for processes that don't produce enough coke to drive the reaction in the reactor. As the term is used herein, "supplemental" means fuel other than the coke itself.

The WHSV in the fluidized fuel gas combustor system may conveniently range from about 0.1 to about 100 lb of air+fuel feed per hour (h) per lb of catalyst in the combustor (lb feed/h/lb catalyst). For example, where a combustor comprises a lower portion that operates as a fast fluidized or turbulent reactor and an upper portion that operates as a riser reactor, the superficial gas velocity may range therein from about 1 feet per second (ft/s, about 0.3 meters per second, m/s) to about 80 ft/s (about 24.38 m/s), preferably from about 2 ft/s (about 0.61 m/s) to 10 ft/s (about 3.05 m/s), in the lower portion of the combustor, and from 20 ft/s (about 6.09 m/s) to about 70 ft/s (about 21.31 m/s) in the upper portion of the combustor. In alternative but less preferred embodiments, a combustor configuration that is fully of a riser type may operate at a single high superficial gas velocity, for example, in some embodiments at least 30 ft/s (about 9.15 m/s) throughout.

It is noted that, in embodiments such as in the two-part combustor described hereinabove, the catalyst flux is preferably from about 1 pound per square foot-second (lb/ft$^2$–s) (4.89 kg/m$^2$–s) to about 20 lb/ft$^2$–s (97.7 kg/m$^2$–s) in the lower portion of the combustor, and from about 10 lb/ft$^2$–s (48.9 kg/m$^2$-s) to about 200 lb/ft$^2$-s (489 kg/m$^2$-s) in the upper portion of the combustor. In a downer combustor, a catalyst flux of higher than about 200 lb/ft$^2$-s may be employed, but is generally not preferred. Those skilled in the art will be able to appropriately adjust catalyst flux based upon WHSV and ratio of catalyst feed to air/supplemental fuel feed.

Pressure in the fluidized fuel gas combustor system ranges from 15 to 70 psia. All individual values and subranges from 15 to 70 psia are included and disclosed herein. For example, the pressure in the fluidized fuel gas combustor system may range from 15 to 70 psia, or in the alternative, from 15 to 45 psia, or in the alternative from 25 to 40 psia, or in the alternative, from 35 to 70 psia.

The present invention may be embodied in other forms without departing from the spirit and the essential attributes thereof, and, accordingly, reference should be made to the appended claims, rather than to the foregoing specification, as indicating the scope of the invention.

We claim:

1. A fluidized fuel gas combustor system for a catalytic dehydrogenation process comprising:
    a vessel having a lower portion and an upper portion;
    a plurality of air injection diffusers located in the lower portion of the vessel;
    optional fuel oil distributors for startup;
    a plurality of fuel gas distributors disposed in the vessel and spaced apart from and above a plurality of air injection diffusers, each fuel gas distributor comprising a tube, a fuel inlet end, a terminal end, and a plurality of fuel gas injection diffusers, wherein the fuel gas injection diffusers are placed in a manner to maximize even mass distribution of a fuel gas injected through the fuel gas injection diffusers in the vessel;
    one or more optional grid assemblies disposed in the vessel spaced apart from and above the plurality of air injection diffusers and spaced apart from and below the plurality of fuel gas distributors to maximize even air mass distribution; and
    one or more grid assemblies disposed in the vessel spaced above the plurality of fuel gas distributors.

2. The fluidized fuel gas combustor system according to claim 1 wherein the tube of each of the plurality of fuel gas distributors comprises a tube and at least one reinforcing element attached to substantially the length of the tube.

3. The fluidized fuel gas combustor system according to claim 1 wherein each of the plurality of fuel gas distributors spans a chord of the vessel and wherein the inlet ends of adjacent fuel gas distributors are located on opposite sides of the vessel.

4. The fluidized fuel gas combustor system according to claim 1 wherein each tube of each of the plurality of fuel gas distributors spans about one half of a chord of the vessel.

5. The fluidized fuel gas combustor system according to claim 1 wherein one or more of the tubes of the plurality of fuel gas distributors are at least partially covered with a refractory material.

6. The fluidized fuel gas combustor system according to claim 1 wherein each tube of the plurality of fuel gas distributors comprises two rows of fuel nozzles at a density of from 5 to 100 points per square meter wherein the rows are spaced apart and angled downward at 45 degrees at approximately 90 degrees from each other.

7. The fluidized fuel gas combustor system according to claim 1 wherein the air distributor is a pipe distributor or dished or plate grid distributor with a diffuser density of from 5 to 100 points per square meters.

8. The fluidized fuel gas combustor system according to claim 1 wherein the air distributor supplies sufficient air to provide greater than 110% of the stoichiometric required amount oxygen for fuel gas combustion.

9. The fluidized fuel gas combustor system according to claim 1 wherein the grid assembly sections comprise subway grating, chevrons, or other means for blocking open area that have an open area of between 30% and 98% with gas velocities through the openings less than 8 feet per second.

10. The fluidized fuel gas combustor system according to claim 1 wherein the fuel oil distributors are atomizing distributors.

11. The fluidized fuel gas combustor system for a catalytic dehydrogenation process according to claim 1 wherein the combustor is operated at a temperature greater than or equal to 660° C.

12. The fluidized fuel gas combustor system for a catalytic dehydrogenation process according to claim 1 wherein the combustor comprises a fast fluidized, turbulent, or bubbling bed and is operated with an average catalyst flow upward.

13. The fluidized fuel gas combustor system for a catalytic dehydrogenation process according to claim 1 wherein the combustor is operated with a WHSV from about 0.1 to about 100 lb of air+fuel feed per hour (h) per lb of catalyst in the combustor (lb feed/h/lb catalyst).

14. The fluidized fuel gas combustor system for a catalytic dehydrogenation process according to claim 1 wherein the combustor comprises a lower portion that operates as a fast fluidized or turbulent reactor and an upper portion that operates as a riser reactor.

15. The fluidized fuel gas combustor system for a catalytic dehydrogenation process according to claim 14 wherein the superficial gas velocity is from 2 ft/s (0.61 m/s) to 10 ft/s (3.05 m/s), in the lower portion of the combustor, and from 20 ft/s (6.09 m/s) to 70 ft/s (21.31 m/s) in the upper portion of the combustor.

16. The fluidized fuel gas combustor system for a catalytic dehydrogenation process according to claim 14 wherein the catalyst flux is from 1 pound per square foot-second (lb/ft$^2$-s) (4.89 kg/m$^2$-s) to 20 lb/ft$^2$-s (97.7 kg/m$^2$-s) in the lower portion of the combustor and from 10 lb/ft$^2$-s (48.9 kg/m$^2$-s) to 200 lb/ft's (489 kg/m$^2$-s) in the upper portion of the combustor.

17. The fluidized fuel gas combustor system for a catalytic dehydrogenation process according to claim 1 wherein the pressure in the combustor is from 15 to 70 psia.

* * * * *

UNITED STATES PATENT AND TRADEMARK OFFICE
CERTIFICATE OF CORRECTION

Page 1 of 1

PATENT NO. : 9,889,418 B2
APPLICATION NO. : 14/868507
DATED : February 13, 2018
INVENTOR(S) : Matthew T. Pretz et al.

It is certified that error appears in the above-identified patent and that said Letters Patent is hereby corrected as shown below:

In the Claims

Column 8, Line 53, Claim 6:
"s) to 200 lb/ft's (489 KG/m$^2$-s) in the upper portion of the"
Should read:
--s) to 200 lb/ft$^2$-s (489 KG/m$^2$-s) in the upper portion of the--.

Signed and Sealed this
Twenty-fifth Day of December, 2018

Andrei Iancu
*Director of the United States Patent and Trademark Office*